(12) United States Patent
Blanchard

(10) Patent No.: US 6,761,087 B2
(45) Date of Patent: Jul. 13, 2004

(54) CASING FOR A TRANSMISSION MECHANISM

(75) Inventor: Robert Blanchard, Le Boupere (FR)

(73) Assignee: France Reducteurs, Les Herbiers (FR)

( * ) Notice: Subject to any disclaimer, the term of this patent is extended or adjusted under 35 U.S.C. 154(b) by 7 days.

(21) Appl. No.: 10/114,050

(22) Filed: Apr. 3, 2002

(65) Prior Publication Data

US 2002/0139222 A1 Oct. 3, 2002

(30) Foreign Application Priority Data

Apr. 3, 2001 (FR) .............................. 01 04521

(51) Int. Cl.[7] .............................................. F16H 57/02
(52) U.S. Cl. ................................ 74/606 R; 74/473.37; 403/326; 403/329
(58) Field of Search .................... 74/473.3, 473.36, 74/473.37, 606 R; 192/69.82; 403/326, 329

(56) References Cited

U.S. PATENT DOCUMENTS

| | | | | |
|---|---|---|---|---|
| 3,529,487 A | * | 9/1970 | Dolan ..................... 74/473.24 |
| 4,324,152 A | * | 4/1982 | Oshima et al. ........... 74/606 R |
| 4,474,218 A | * | 10/1984 | Sample ........................ 139/1 E |
| 4,662,477 A | * | 5/1987 | Minoru ......................... 185/45 |
| 5,287,769 A | * | 2/1994 | von Kaler .................. 74/606 R |
| 5,487,318 A | * | 1/1996 | Schott ....................... 74/606 R |
| 5,560,432 A | * | 10/1996 | Conte ...................... 192/69.82 |
| 5,651,632 A | * | 7/1997 | Gordon ....................... 403/319 |
| 5,853,261 A | * | 12/1998 | Keruzore .................... 403/350 |

* cited by examiner

*Primary Examiner*—David A. Bucci
*Assistant Examiner*—Timothy McAnulty
(74) *Attorney, Agent, or Firm*—Young & Thompson

(57) ABSTRACT

A casing (1) for a transmission mechanism constituted by two half shells (1A, 1B), contains at least one clutch control member (3) moved angularly by a control lever (4) external to the casing (1) The control lever (4) includes a split sleeve (5) insertable within a receiving bearing (6) of the casing (1), this sleeve (5) defining at least two fingers (7A, 7B) that are resiliently deformable so as to be able to be immobilized axially in the receiving bearing (6), a portion (3A) of the body of the control member (3) being disposed in the assembled condition of the half shells (1A, 1B) of the casing (1) in the slots (8) provided between the fingers (7A, 7B) to render the lever (4) undisassembleable.

20 Claims, 6 Drawing Sheets ably a cylindrical core in the drawings, of a diameter substantially equal to the width of the slot 8 of the sleeve 5.

CASING FOR A TRANSMISSION MECHANISM

BACKGROUND OF THE INVENTION

The present invention relates to a casing for a transmission mechanism of any type constituted by two half shells generally assembleable along a joint plane.

It relates more particularly to a casing containing at least one member, such as a fork, for controlling the clutching or speed change, this member being moved angularly by means of a control lever outside the casing.

DESCRIPTION OF THE RELATED ART

Such casings for transmission mechanisms are well known to those skilled in the art. Until now, the connection between the clutch control fork and the control lever is carried out as follows. The lever comprises a sleeve within which is inserted the fork held by means of a screw connection.

This connection has various drawbacks. It requires in particular the use of connection members between the lever and the fork and does not permit a permanent connection of the lever to the fork. Moreover, the use of screws gives rise to problems of sealing of the contents of the casing.

SUMMARY OF THE INVENTION

An object of the present invention is to provide a casing of a new type whose design permits rendering the connection between the control lever and the clutch control member or speed change member, permanent without the addition of supplemental connection members, such as screws or the like.

Another object of the present invention is to provide a casing whose design of the connection between the clutch control or speed control member and the control lever, permits rapid and instantaneous mounting of the connection between said elements.

To this end, the invention has for its object a casing of a transmission mechanism of any nature, constituted by two half shells generally assembleable along a joint plane, this casing containing at least one member, such as a fork, for controlling clutching or speed change, this member being moved angularly by means of a control lever external to the casing, characterized in that the control lever comprises a slotted sleeve insertable within a bearing receiving the casing, this sleeve defining at least two resiliently deformable fingers that can be axially immobilized reversibly in said receiving bearing, a portion of the body of the control member being disposed in the assembled condition of the half shells of the casing, in a diametral slot provided between said fingers for on the one hand securing the lever and the control member together for angular movement, and on the other hand neutralizing the resililent function of the fingers and rendering the lever undisassembleable.

BRIEF DESCRIPTION OF THE DRAWINGS

The invention will be understood from a reading of the following description of embodiments, with reference to the accompanying drawings, in which.

DESCRIPTION OF THE PREFERRED EMBODIMENTS

Figure 1:
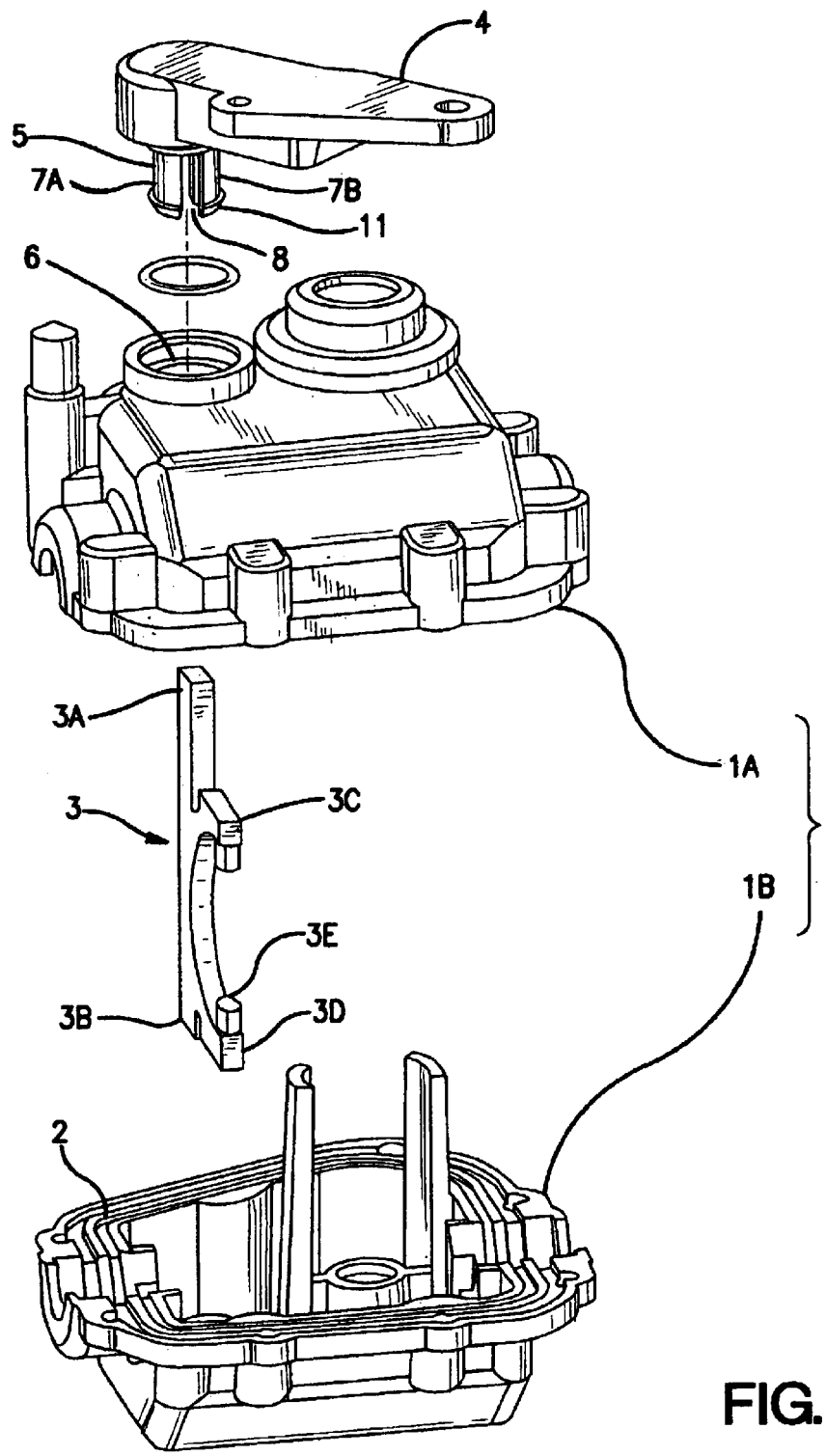
FIG. 1 is a partial perspective view of a casing according to the invention in exploded condition of the elements constituting it.
Figure 2:
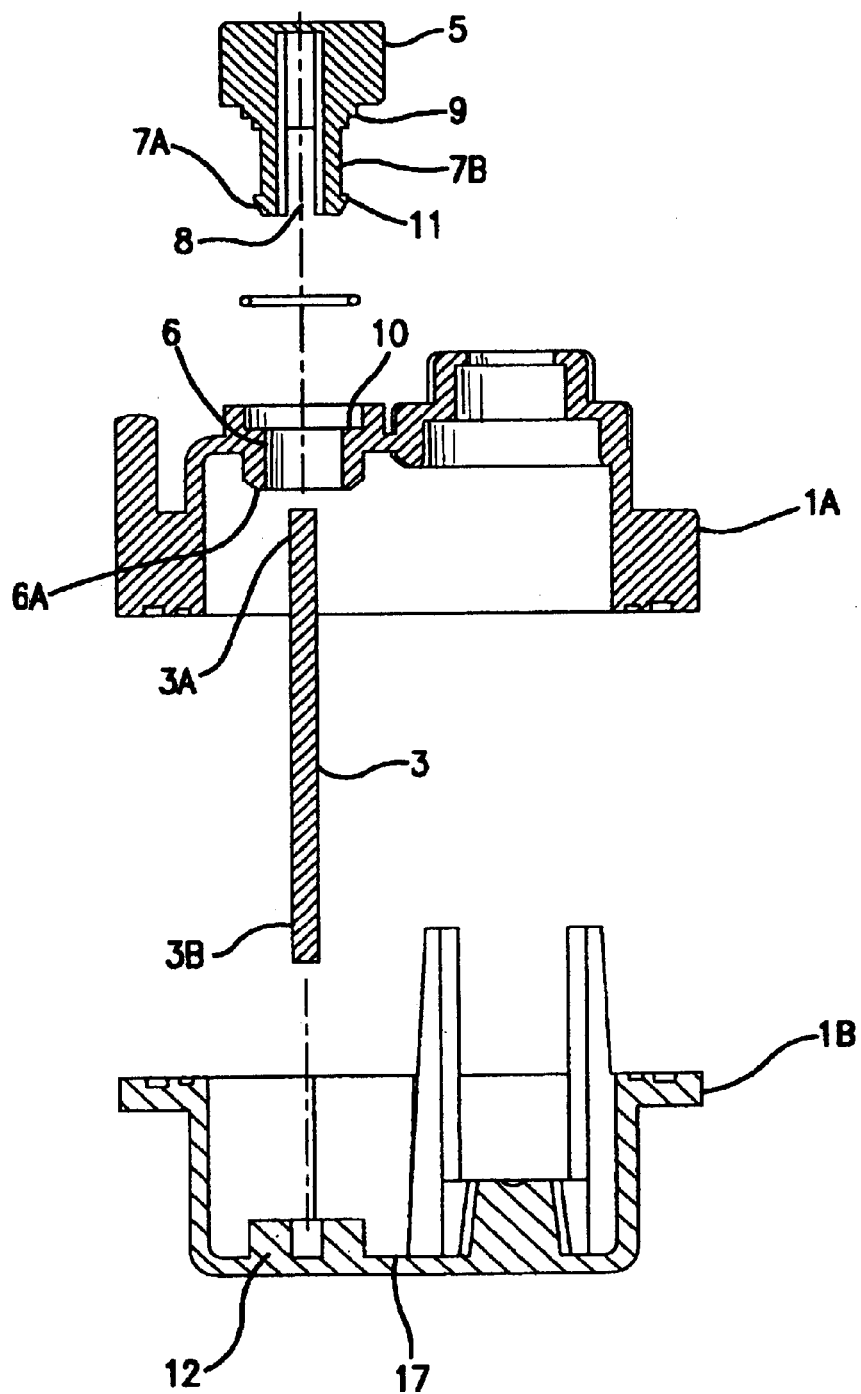
FIG. 2 is a fragmentary cross-sectional view of the casing of FIG. 1 in the exploded condition of the elements constituting it.
Figure 3:
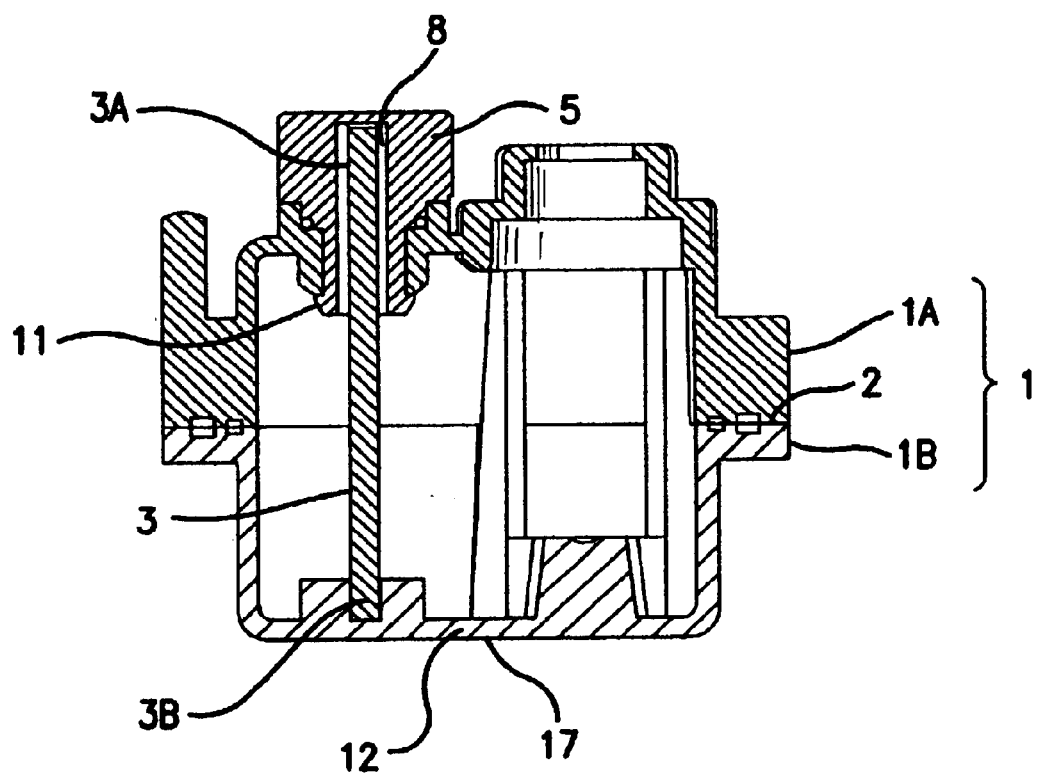
FIG. 3 is a partial cross-sectional view of the casing of FIG. 1 in the assembled condition of the elements constituting it.

As mentioned above, the casing 1, according to the invention, is constituted by two half shells 1A, 1B, generally of synthetic material, assembled generally along a joint plane 2. This casing 1 contains at least one member 3, such as a fork, for controlling the clutching or speed change. This member 3 is moved angularly by means of a control lever 4 external to the casing 1. This lever 4 is itself controlled by a cable from a control member positioned adjacent the engine when this casing for the transmission mechanism is incorporated in a self-propelled movable engine, such as a lawn mower.

In a manner characteristic of the invention, this control lever 4 comprises a slotted sleeve 5 insertable within a receiving bearing 6 provided in a half shell 1A of the casing 1. Preferably, this receiving bearing 6 is of one piece with one of the walls, in this instance the bottom wall of the half shell 1A, of the casing 1. This sleeve 5 defines at least two fingers 7A, 7B that are resiliently deformable and adapted to be immobilized axially by resilient deformation in a reversible manner in the receiving bearing 6. Once this sleeve 5 is positioned within the receiving bearing 6, a portion 3A of the body of the control member 3 is disposed within, in the assembled condition of the half shells 1A, 1B of the casing 1, in the diametral slots 8 provided between said fingers 7A, 7B for, on the one hand, to secure the lever 4 and control member 3 together for angular movement, on the other hand to neutralize the resilient function of the fingers 7A, 7B and to render the lever 4 proof against disassembly.

In the illustrated examples, to permit the axial immobilization of the split sleeve 5 in the receiving bearing 6 for the half shell 1A of the casing 1, this slotted sleeve 5 comprises, in its region for connection to the base of the fingers 7A, 7B, at least one shoulder 9 coming into abutment against a shoulder 10 of the bearing receiving the casing 1 in the inserted position of the sleeve 5 in the bearing 6. The free end of the fingers 7A, 7B is provided with a non-return lug 11 coming, in this inserted position of the sleeve 5, into engagement with the internal radial surface 6A of the bearing 6 of the casing 1. There is thus obtained the axial immobilization of the control member 3, this immobilization being reversible because of the resilience of the fingers.

In the example shown in FIG. 1, the slotted sleeve 5 has a diametral slot 8 within which is inserted one end 3A of the body of the control member 3 constituted by a core of square or rectangular cross-section such that, in the locked position, the core of the control member 3 extends into a diametral plane of the sleeve 5. Obviously, other embodiments of the body of the control member 3 and the slotted sleeve 5 could be envisaged, particularly by multiplying the number of fingers and accordingly the number of slots and by adapting the shape of the body of the control member to the number of slots.

Figure 4:
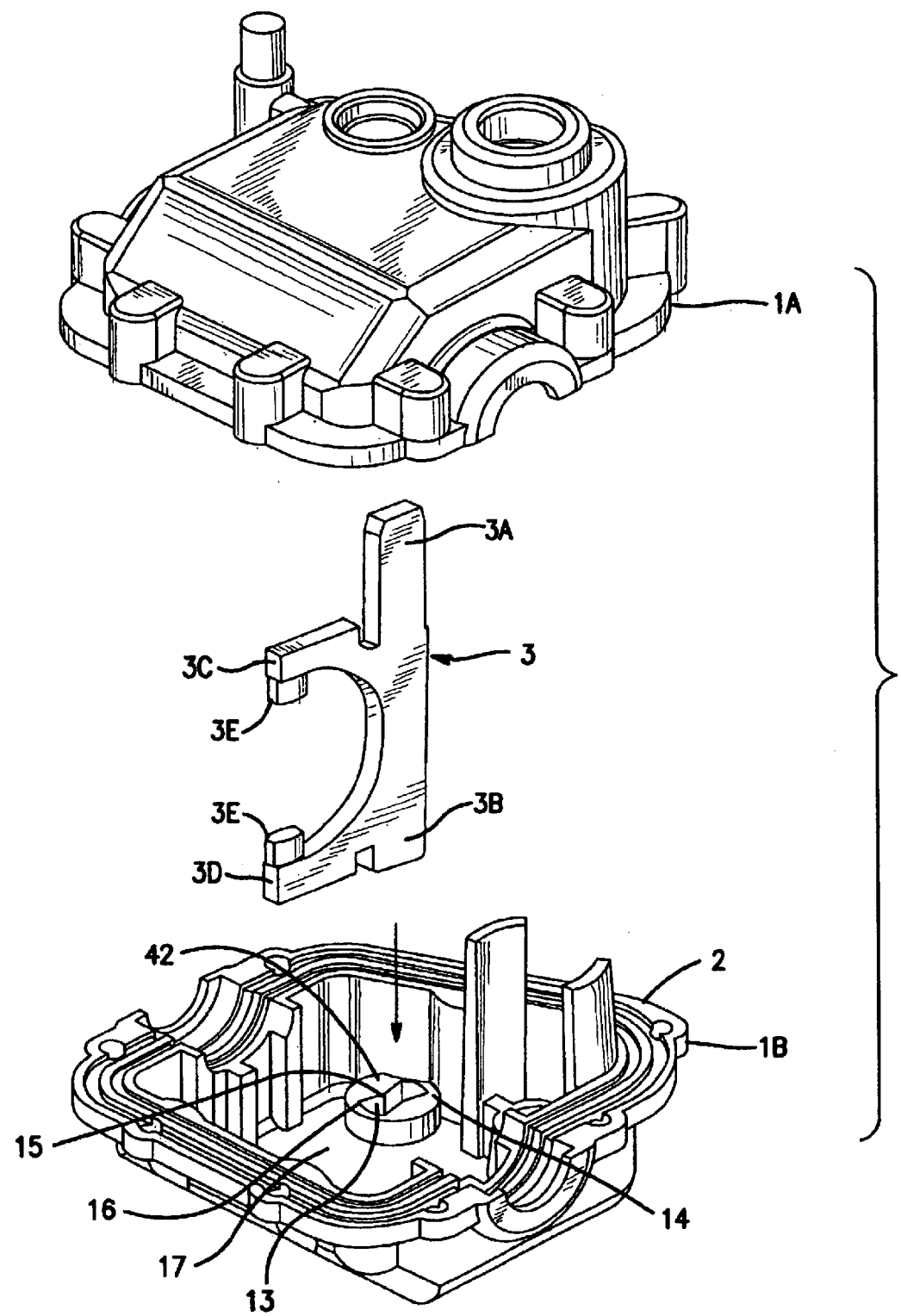
FIG. 4 is a partial perspective view of the casing of FIG. 1 from a different angle of view.
Figure 5:
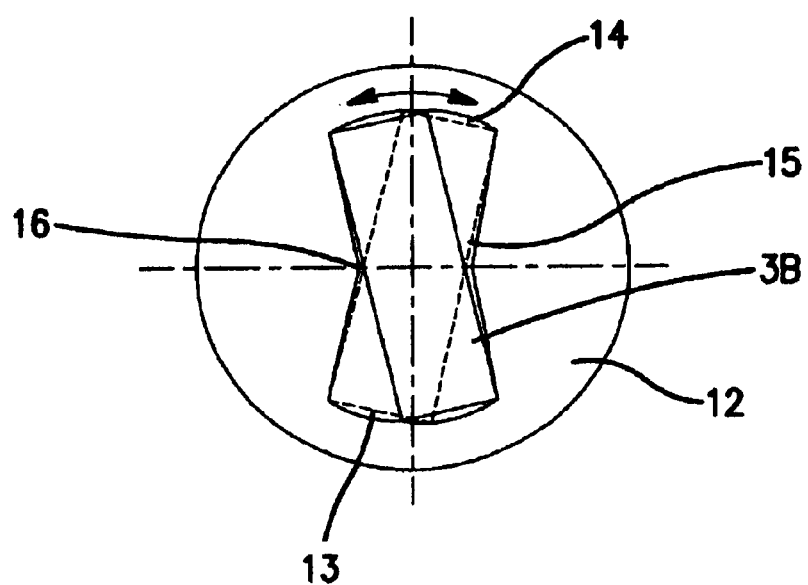
FIG. 5 is a detailed view from above of a bearing adapted to receive one end of the control member.

To increase the simplicity of mounting the control member 3 and reducing the number of pieces used, the end 3B of the body of the control member 3 opposite the end 3A disposed in the receiving bearing 6 of the casing 1 receiving the slotted sleeve 5, is disposed within a bearing 12 of the casing 1. This bearing 12 is constituted, as shown in FIG. 4, by a cavity 13 of generally butterfly cross-section whose two opposite walls 14 are delimited by convex surfaces interconnected by two dihedra 15 disposed so as to form the wings of a butterfly. The edges 16 of the dihedra 15 thus constitute the pivotal axis of said control member 3 as shown in FIG. 5, in which one of the positions of the control member 3 is shown in full line and the other position in broken line.

Preferably, this cavity 13 of generally butterfly cross-sectional shape, is in one piece with a wall 17 of a half shell, in this instance the half shell 1B, of the casing 1. The bearings 6 and 12 thus constituted are disposed facing each other in the assembled condition of the half shells 1A, 1B of the casing 1.

Figure 6:
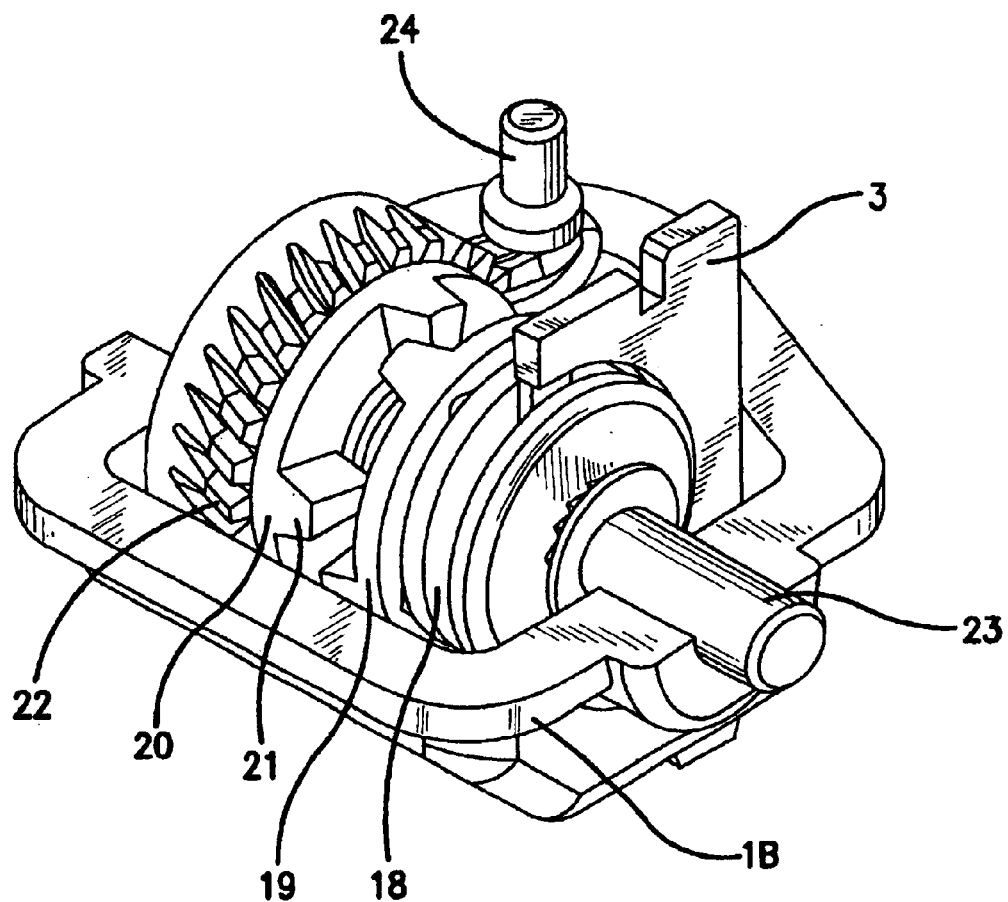
FIG. 6 is a fragmentary schematic view of a half shell of the casing within which have been inserted the clutch and reduction mechanisms.

Although the control member 3 can have a large number of shapes, in the examples shown, this control member 3 is a fork with two branches 3C, 3D. The core of the fork, connecting said branches 3C, 3D together, is axially prolonged on opposite sides of said branches 3C, 3D to form sections of a rod 3A, 3B of square or rectangular cross-section to be inserted in the bearings 6, 12 provided in each half shell 1A, 1B of the casing 1. Each branch 3C, 3D of the fork is provided with an internal radial tooth 3E so as to ensure trapping the teeth 3E of the fork within an annular external throat 18 of an axially movable flange 19 of a clutch mechanism. In this case, and as shown in FIG. 6, the clutch mechanism is a dog lug mechanism disposed within the casing 1. This mechanism is constituted by two hollow flanks 19, 20 bearing on their surface facing the teeth 21. One of the flanges 20 is secured in rotation to a toothed wheel 22 of a reduction mechanism disposed also at least partially within the casing 1, whilst the other plate 19, secured in rotation to an output shaft passing through said casing 1, is movable axially under the action of the control member 3 particularly in the direction to approach the other plate 20. Thus, during moving together of the plates 19, 20, the teeth 21 of the plates 19, 20 interfinger so as to ensure, under the effect of a drive in rotation of the toothed wheel 22, a driving in rotation of the axially movable plate 19 and correspondingly a driving in rotation of the output shaft 23 passing axially through said plates 19, 20. This output shaft 23 can thus constitute the drive shaft of the wheels of a self-propelled engine. The toothed wheel 22, which constitutes the drive member of the reducing mechanism, can itself be driven in rotation by means of an endless screw 24 coupled by means of a suitable transmission device to a motor member such as the blade carrying shaft of a lawn mower.

Of course, other applications of this casing containing a transmission mechanism of any nature can be envisaged.

List of Reference Numerals 1-casing; 1A–1B
2-joint plane
3-control member; 3A-end, 3B-end, 3C, 3C-branch, 3E-tooth
4-lever
5-sleeve
6-receiving bearing
7A, 7B-fingers
8-slots
9-shoulder of the sleeve 5
10-shoulder of the bearing 6
11-lug
12-lower bearing
13-cavity
14-convex wall
15-dihedral
16-edge of the dihedral
17-bottom wall of the casing
18-throat
19-plate
20-plate
21-teeth on the plates
22-toothed wheel
23-output shaft
24-endless screw

What is claimed is:

1. Casing (1) of a transmission mechanism, constituted by two half shells (1A, 1B) generally assembled along a joint plane (2), the casing (1) containing at least one control member (3) for clutch control (19, 20) or for speed change, the control member (3) being movable angularly by means of a control lever (4) external to the casing (1),
characterized in that the control lever (4) comprises a slotted sleeve (5) insertable within a receiving bearing (6) of the casing (1), the sleeve (5) defining at least two resiliently deformable fingers (7A, 7B) to be able to be immobilized axially in a reversible manner in said receiving bearing (6), a portion (3A) of a body of the control member (3) being disposed in the assembled condition of the half shells (1A, 1B) of the casing (1) in slots (B) provided between said fingers (7A, 7B) for securing in angular movement the lever (4) and the control member (3), and neutralizing the resilient function of the fingers (7A, 7B) and rendering the lever (4) undisassembleable.

2. Casing (1) according to claim 1, characterized in that the slotted sleeve (5) comprises, in its region of connection to the base of the fingers (7A, 7B), at least one shoulder (9) coming into abutment against a shoulder (10) of the receiving bearing (6) of the casing (1) in the inserted position of the sleeve (5) in the bearing (6), free end of the fingers (7A, 7B) being provided with a non-return lug (11) coming, in this inserted position of the sleeve (5), into engagement with the internal radial surface (6A) of the bearing (6) of the housing (1) thereby axially to immobilize the sleeve (5) within the casing (1).

3. Casing (1) according to claim 1,
characterized in that the slotted sleeve (5) has a diametral slot (8) within which is inserted one end (3A) of the body of the control member (3) constituted by a core of square or rectangular cross-section such that, in the locked position, the core of the control member (3) extends in a diametral plane of the sleeve (5).

4. Casing (1) according to claim 1,
characterized in that an end (3B) of the body of the control member (3) opposite the one (3A) disposed in the receiving bearing (6) of the casing (1) receiving the slotted sleeve (5), is disposed within a bearing (12) of the casing (1) constituted by a cavity (13) of a cross-section of a butterfly shape whose two opposite walls (14) are delimited by convex surfaces interconnected so as to form the wings of a butterfly shape, the edges (16) of the wings (15) constituting the pivotal axis of said control member (3).

5. Casing (1) according to claim 4, characterized in that the cavity (13) of butterfly cross-section is of one piece with a wall (17) of a half shell (1B) of the casing (1).

6. Casing (1) according to claim 1,
characterized in that the control member (3) is a fork with two branches (3C, 3D), the core of the fork, connecting said branches (3C, 3D) together, being prolonged axially on opposite sides of said branches (3C, 3D) to form sections of a rod (3A, 3B) of square or rectangular cross-section inserted in the bearings (6, 12) provided in each half shell (1A, 1B) of the casing (1), each branch (3C, 3D) of the fork being provided with an internal radial tooth (3E) so as to ensure trapping the teeth (3E) of the fork within an annular external throat (18) of an axially movable plate (19) of a clutch mechanism (19, 20).

7. Casing (1) according to claim 1,
characterized in that the clutch mechanism (19, 20) is a dog lug mechanism disposed within the casing (1), this mechanism being constituted by two hollowed plates (19, 20) bearing on their facing surface teeth (21), one (20) of the plates (19, 20) being secured in rotation with a toothed wheel (22) of a reducing mechanism also disposed at least partially within the casing (1) whilst the other plate (19), securable in rotation to an output shaft (23) passing through said casing (1), is axially movable under the action of the control member (3) particularly in the direction to approach the other plate (20) such that the teeth (21) of the plates (19, 20) enter between each other so as to ensure, under the influence of driving in rotation of the toothed wheel (22), a driving in rotation of the axially movable plate (19) and accordingly a driving in rotation of an output shaft (23) passing axially through said plates (19, 20).

8. Casing (1) of a transmission mechanism, comprising:
two half shells (1A, 1B) assembled along a joint plane (2);
at least one control member (3) for clutch control (19, 20) or for speed change;
the control member (3) being movable angularly by a control lever (4) external to the casing (1),
the control lever (4) comprising a slotted sleeve (5) insertable within a receiving bearing (6) of the casing (1);
the slotted sleeve (5) defining at least two resiliently deformable fingers (7A, 7B) with slots between said fingers,
the deformable fingers able to be immobilized axially in a reversible manner in said receiving bearing (6);
the control member including a body,
a portion (3A) of the body of the control member being disposed, in the assembled condition of the half shells (1A, 1B), in the slots (8) between said fingers (7A, 7B) for securing in angular movement the control lever (4) and the control member (3), and for neutralizing the resilient function of the fingers (7A, 7B) and rendering the lever (4) undisassembleable.

9. The casing of claim 8, wherein the control member is a fork.

10. Casing (1) according to claim 8, wherein,
the slotted sleeve (5) comprises, in its region of connection to the base of the fingers (7A, 7B), at least one shoulder (9) coming into abutment against a shoulder (10) of the receiving bearing (6) of the casing in the inserted position of the sleeve (5) in the bearing (6), and free end of the fingers (7A, 7B) being provided with a non-return lug (11) coming, in this inserted position of the sleeve (5), into engagement with the internal radial surface (6A) of the bearing (6) of the housing (1) thereby axially to immobilize the sleeve (5) within the casing (1).

11. Casing (1) according to claim 8, wherein,
the slotted sleeve (5) has a diametral slot (8) within which is inserted one end (3A) of the body of the control member (3) constituted by a core of square or rectangular cross-section such that, in the locked position, the core of the control member (3) extends in a diametral plane of the sleeve (5).

12. Casing (1) according to claim 8, wherein,
an end (3B) of the body of the control member (3) opposite another end (3A) disposed in the receiving bearing (6) of the casing (1) receiving the slotted sleeve (5), is disposed within a bearing (12) of the casing (1) constituted by a cavity (13) of a cross-section of a butterfly shape whose two opposite walls (14) are delimited by convex surfaces interconnected to form the wings of a butterfly shape.

13. Casing (1) according to claim 12, wherein,
the cavity (13) of butterfly cross-section is of one piece with a wall (17) of a half shell (1B) of the casing (1).

14. Casing (1) according to claim 8, wherein,
the control member (3) is a fork with two branches (3C, 3D), the core of the fork, connecting said branches (3C, 3D) together, being prolonged axially on opposite sides of said branches (3C, 3D) to form sections of a rod (3A, 3B) of square or rectangular cross-section inserted in the bearings (6, 12) provided in each half shell (1A, 1B) of the casing (1), each branch (3C, 3D) of the fork being provided with an internal radial tooth (3E) so as to ensure trapping the teeth (3E) of the fork within an annular external throat (18) of an axially movable plate (19) of a clutch mechanism (19, 20).

15. Casing (1) according to claim 14, wherein, the clutch mechanism (19, 20) is a dog lug mechanism disposed within the casing (1), this mechanism being constituted by two hollowed plates (19, 20) bearing on their facing surface teeth (21), one (20) of the plates (19, 20) being secured in rotation with a toothed wheel (22) of a reducing mechanism also disposed at least partially within the casing (1) whilst the other plate (19), securable in rotation to an output shaft (23) passing through said casing (1), is axially movable under the action of the control member (3) particularly in the direction to approach the other plate (20) such that the teeth (21) of the plates (19, 20) enter between each other so as to ensure, under the influence of driving in rotation of the toothed wheel (22), a driving in rotation of the axially movable plate (19) and accordingly a driving in rotation of an output shaft (23) passing axially through said plates (19, 20).

16. Casing (1) according to claim 14, wherein,
the clutch mechanism (19, 20) is a dog lug mechanism disposed within the casing (1), this mechanism being constituted by two hollowed plates (19, 20) bearing on their facing surface teeth (21), one (20) of the plates (19, 20) being secured in rotation with a toothed wheel (22) of a reducing mechanism also disposed at least partially within the casing (1) whilst the other plate (19), securable in rotation to an output shaft (23) passing through said casing (1), is axially movable under the action of the control member (3) particularly in the direction to approach the other plate (20) such that the teeth (21) of the plates (19, 20) enter between each other so as to ensure, under the influence of driving in rotation of the toothed wheel (22), a driving in rotation of the axially movable plate (19) and accordingly a driving in rotation of an output shaft (23) passing axially through said plates (19, 20).

17. Casing (1) of a transmission mechanism, comprising:

two half shells (1A, 1B) assembled along a joint plane (2);

at least one control member (3) for clutch control (19, 20) or for speed change, the control member including a body;

a control lever (4) external to the casing and connected to angularly move the control member (3), the control lever (4) comprising a slotted sleeve (5) insertable within a receiving bearing (6) of the casing (1);

the slotted sleeve (5) defining at least two resiliently deformable fingers (7A, 7B), the deformable fingers able to be immobilized axially in a reversible manner in said receiving bearing (6);

slots (8) located between the deformable fingers;

a portion (3A) of the body of the control member being disposed, in the assembled condition of the half shells (1A, 1B), in the slots for securing in angular movement the control lever (4) and the control member (3), and for neutralizing the resilient function of the fingers (7A, 7B) and rendering the lever (4) undisassembleable.

18. Casing (1) according to claim 17, wherein, the slotted sleeve (5) comprises, in its region of connection to the base of the fingers (7A, 7B), at least one shoulder (9) coming into abutment against a shoulder (10) of the receiving bearing (6) of the casing in the inserted position of the sleeve (5) in the bearing (6), and free end of the fingers (7A, 7B) being provided with a non-return lug (11) coming, in this inserted position of the sleeve (5), into engagement with the internal radial surface (6A) of the bearing (6) of the housing (1) thereby axially to immobilize the sleeve (5) within the casing (1).

19. Casing (1) according to claim 17, wherein, the slotted sleeve (5) has a diametral slot (8) within which is inserted one end (3A) of the body of the control member (3) constituted by a core of square or rectangular cross-section such that, in the locked position, the core of the control member (3) extends in a diametral plane of the sleeve (5).

20. Casing (1) according to claim 17, wherein, the control member (3) is a fork with two branches (3C, 3D), the core of the fork, connecting said branches (3C, 3D) together, being prolonged axially on opposite sides of said branches (3C, 3D) to form sections of a rod (3A, 3B) of square or rectangular cross-section inserted in the bearings (6, 12) provided in each half shell (1A, 1B) of the casing (1), each branch (3C, 3D) of the fork being provided with an internal radial tooth (3E) so as to ensure trapping the teeth (3E) of the fork within an annular external throat (18) of an axially movable plate (19) of a clutch mechanism (19, 20).

* * * * *